(12) United States Patent
Yoshizawa et al.

(10) Patent No.: US 11,947,757 B2
(45) Date of Patent: *Apr. 2, 2024

(54) PERSONAL DIGITAL ASSISTANT

(71) Applicant: Maxell, Ltd., Kyoto (JP)

(72) Inventors: Kazuhiko Yoshizawa, Kyoto (JP);
Yasunobu Hashimoto, Kyoto (JP);
Sadao Tsuruga, Kyoto (JP); Susumu Yoshida, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,263

(22) Filed: Apr. 11, 2022

(65) Prior Publication Data

US 2022/0236854 A1   Jul. 28, 2022

Related U.S. Application Data

(63) Continuation of application No. 16/979,966, filed as application No. PCT/JP2018/009956 on Mar. 14, 2018, now Pat. No. 11,301,087.

(51) Int. Cl.
*G06F 3/041* (2006.01)

(52) U.S. Cl.
CPC ................ *G06F 3/04186* (2019.05)

(58) Field of Classification Search
CPC ... G06F 3/04186; G06F 3/0418; G06F 3/0488
See application file for complete search history.

(56) References Cited

U.S. PATENT DOCUMENTS 10,732,792 B2 *   8/2020   Lee ................ H04N 21/42204
11,163,428 B1 *  11/2021   Mansour ............ G06F 3/04842
(Continued)

FOREIGN PATENT DOCUMENTS

EP     2818994 A     12/2014
JP   2012-217101 A   11/2012
(Continued)

OTHER PUBLICATIONS

International Search Report of PCT/JP2018/009956 dated May 22, 2018.

(Continued)

*Primary Examiner* — Ibrahim A Khan
(74) *Attorney, Agent, or Firm* — Mattingly & Malur, PC

(57) ABSTRACT

A personal digital assistant includes a display control unit that causes an object as a target of the touch operation to be displayed in the image display unit, an image input unit that acquires a video of an operation instruction object that performs the touch operation on the touch screen, and a shaking detection unit that analyzes the video of the operation instruction object, which is acquired by the image input unit, and calculates a relative shaking amount of the operation instruction object to a position of the personal digital assistant as a reference. The display control unit causes the object to be displayed in the image display unit to be displayed, based on the relative shaking amount of the operation instruction object, which is calculated by the shaking detection unit, such that the object is shifted in accordance with the relative shaking amount.

12 Claims, 11 Drawing Sheets

ERRONEOUS OPERATION PREVENTION PROCESSING (EXAMPLE 5)

(56) References Cited

U.S. PATENT DOCUMENTS

| | | | |
|---|---|---|---|
| 2002/0101510 A1* | 8/2002 | Basson | G02B 27/017 348/208.99 |
| 2010/0079356 A1 | 4/2010 | Hoellwarth | |
| 2011/0227911 A1* | 9/2011 | Joo | H04N 13/156 345/419 |
| 2011/0246944 A1* | 10/2011 | Byrne | G06F 3/04895 715/835 |
| 2012/0176314 A1* | 7/2012 | Jeon | G06F 3/017 345/158 |
| 2012/0194429 A1* | 8/2012 | Kwon | G06F 3/038 345/157 |
| 2012/0242587 A1* | 9/2012 | Tom | G06F 3/03547 345/173 |
| 2013/0066526 A1* | 3/2013 | Mondragon | G06V 40/20 701/49 |
| 2013/0082939 A1* | 4/2013 | Zhao | G06F 1/3265 345/173 |
| 2013/0265218 A1* | 10/2013 | Moscarillo | G06F 3/0426 345/156 |
| 2014/0025263 A1* | 1/2014 | Geyer | B60W 50/10 701/49 |
| 2014/0033253 A1* | 1/2014 | Cho | G09G 5/08 725/37 |
| 2014/0062893 A1* | 3/2014 | Kawalkar | G06F 3/0488 345/173 |
| 2014/0160048 A1* | 6/2014 | Conway | G06F 3/041 345/173 |
| 2014/0267400 A1* | 9/2014 | Mabbutt | G02B 27/0093 345/633 |
| 2014/0300542 A1* | 10/2014 | Jakubiak | G06F 3/0425 345/157 |
| 2014/0317554 A1* | 10/2014 | Song | H04N 21/485 715/781 |
| 2014/0361997 A1* | 12/2014 | Wen | G06F 3/04883 345/173 |
| 2015/0002403 A1* | 1/2015 | Dostal | G06F 3/0418 345/173 |
| 2015/0022551 A1* | 1/2015 | Kim | G06T 19/006 345/633 |
| 2015/0067580 A1* | 3/2015 | Um | G06F 3/0481 715/781 |
| 2015/0205943 A1* | 7/2015 | Takenaka | G06F 3/04847 726/17 |
| 2015/0291032 A1* | 10/2015 | Kim | B60K 35/00 280/779 |
| 2015/0338960 A1* | 11/2015 | Yumoto | G06F 3/0446 345/174 |
| 2015/0346701 A1* | 12/2015 | Gordon | H04L 12/2809 700/275 |
| 2016/0004320 A1 | 1/2016 | Lundberg et al. | |
| 2016/0018944 A1* | 1/2016 | Kim | G06F 1/1694 345/173 |
| 2016/0189351 A1* | 6/2016 | Holz | G06F 3/0346 345/173 |
| 2016/0196035 A1* | 7/2016 | Lee | G06F 3/0346 715/810 |
| 2017/0192617 A1* | 7/2017 | Barth | G06F 3/0425 |
| 2017/0228095 A1* | 8/2017 | Domaradzki | G06F 3/0481 |
| 2017/0270715 A1* | 9/2017 | Lindsay | G06T 7/60 |
| 2018/0033204 A1* | 2/2018 | Dimitrov | G06T 15/20 |
| 2018/0039377 A1* | 2/2018 | Akita | G06V 20/593 |
| 2018/0136744 A1* | 5/2018 | Karlsson | G06F 3/011 |
| 2018/0143693 A1* | 5/2018 | Calabrese | G06V 40/193 |
| 2019/0045135 A1* | 2/2019 | Ryu | H04N 23/635 |

FOREIGN PATENT DOCUMENTS

| | | |
|---|---|---|
| JP | 2015-106915 A | 6/2015 |
| JP | 2016-005125 A | 1/2016 |
| JP | 2017-199345 A | 11/2017 |
| JP | 2017-199379 A | 11/2017 |
| WO | 2015/030264 A1 | 3/2015 |

OTHER PUBLICATIONS

Notice of Reasons for Refusal dated Dec. 24, 2021, issued in corresponding Japanese Patent Application No. 2020-506020.

Japanese Office Action received in corresponding Japanese Application No. 2022-160637 dated Oct. 24, 2023.

* cited by examiner

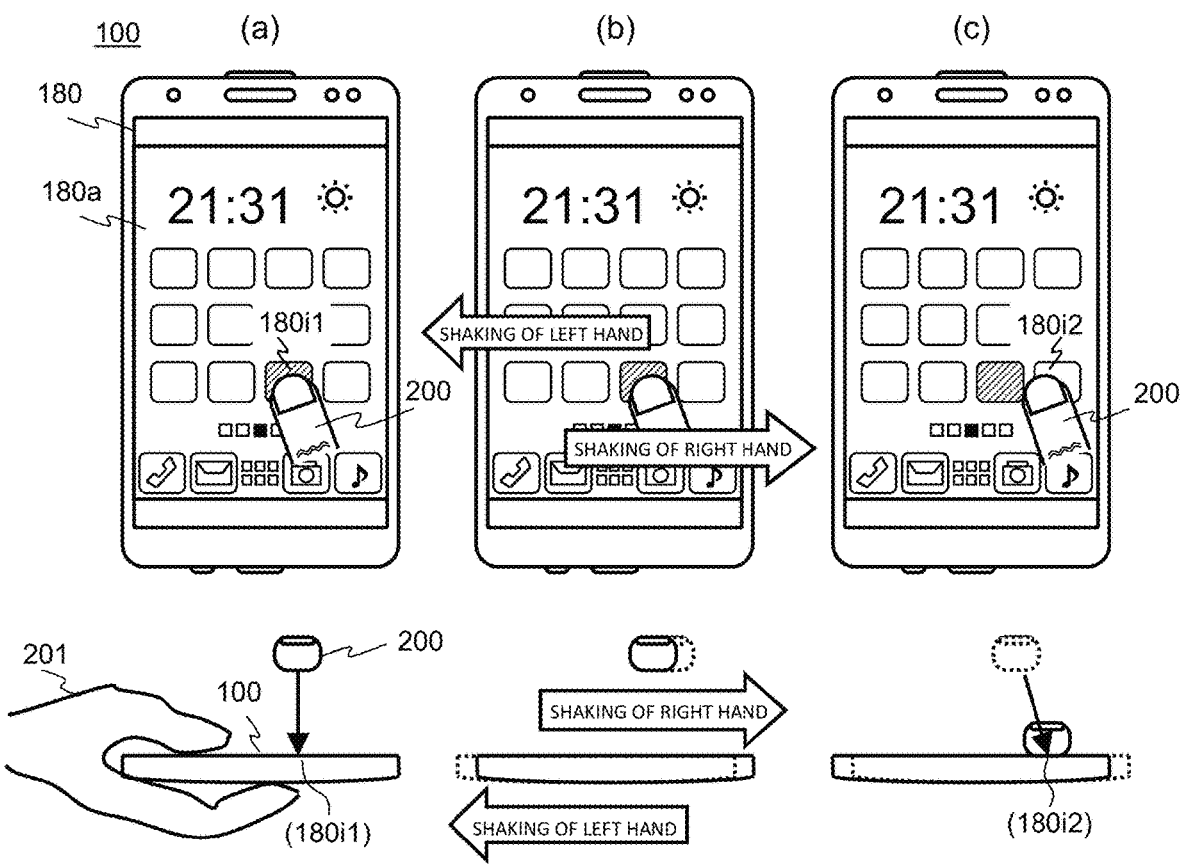

ERRONEOUS OPERATION PREVENTION PROCESSING (EXAMPLE 1)

CONFIGURATION OF IN-CAMERA

ERRONEOUS OPERATION PREVENTION PROCESSING (EXAMPLE 1)

DETERMINATION OF WHETHER OR NOT OPERATION INSTRUCTION OBJECT IS PROVIDED

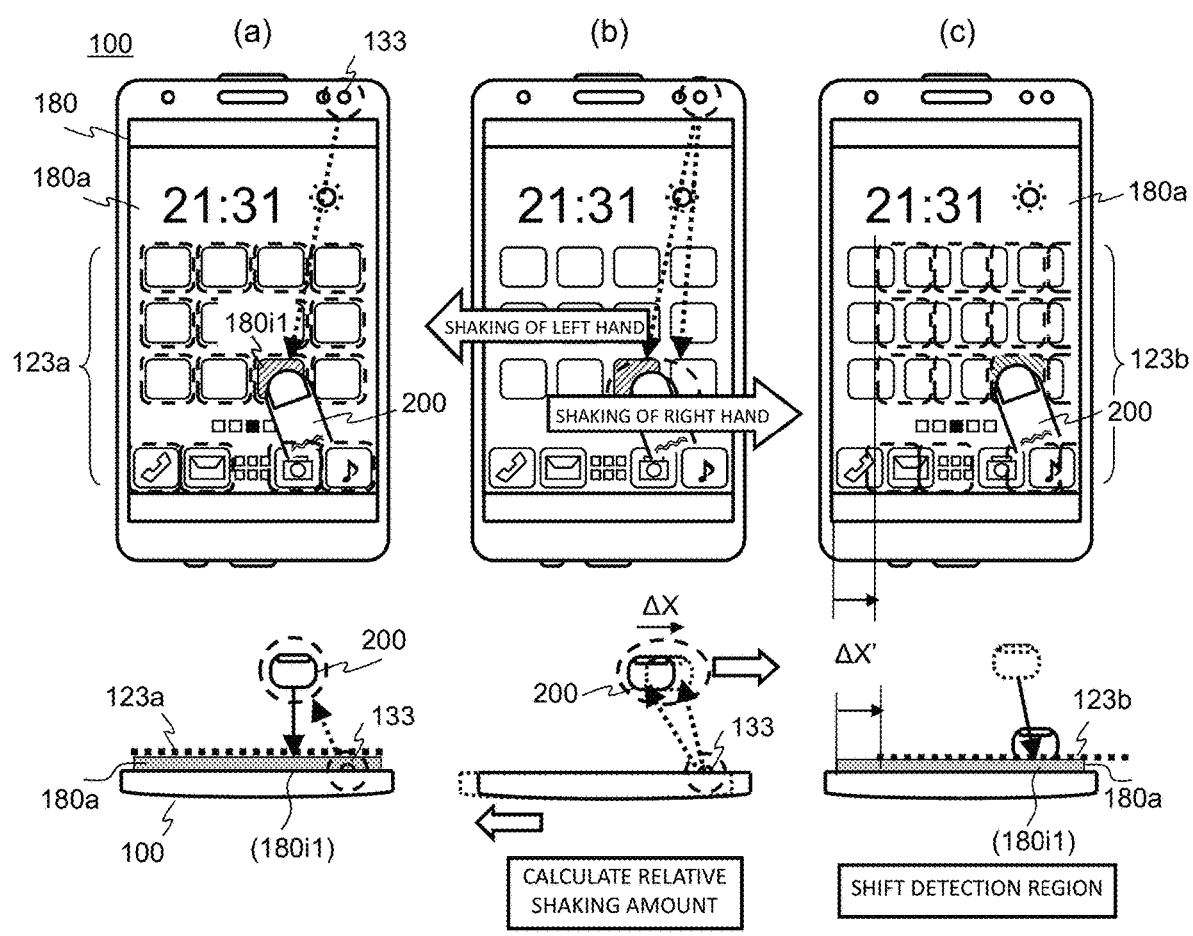

ERRONEOUS OPERATION PREVENTION PROCESSING (EXAMPLE 3)

ERRONEOUS OPERATION PREVENTION PROCESSING (EXAMPLE 3)

ERRONEOUS OPERATION PREVENTION PROCESSING (EXAMPLE 4)

ERRONEOUS OPERATION PREVENTION PROCESSING (EXAMPLE 4)

FIG. 9A
WHEN VIEWING DEVICE IS USED
(a)
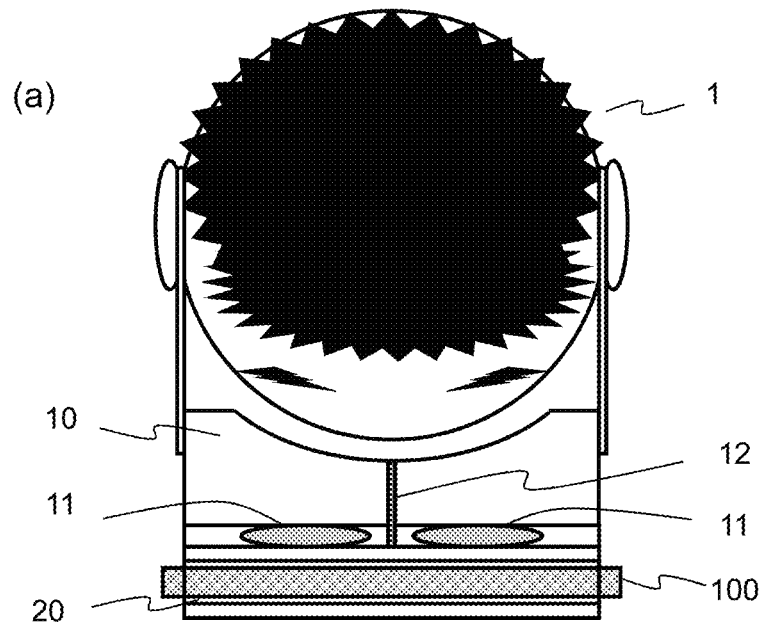
(b)
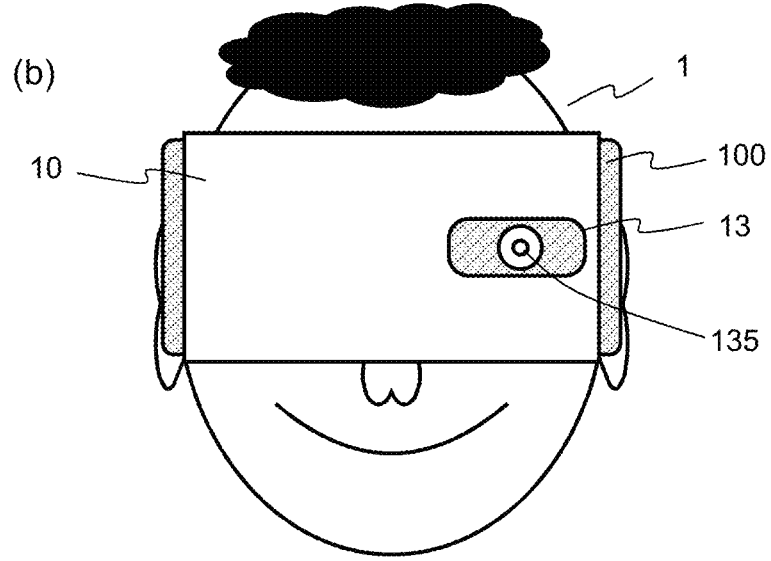

ERRONEOUS OPERATION PREVENTION PROCESSING (EXAMPLE 5)

PERSONAL DIGITAL ASSISTANT

TECHNICAL FIELD

The present invention relates to an erroneous operation prevention technology in a personal digital assistant including a touch screen.

BACKGROUND ART

Personal digital assistants such as smart phones and tablet terminals are becoming widespread. The personal digital assistant includes a touch screen. A user may instruct a desired operation to the personal digital assistant by performing a touch operation on the touch screen. For example, the user may activate an application associated with the icon at a touch position by touching a region in which an icon or the like is displayed on the touch screen, with a finger or the like.

Generally, a display position of an object such as an icon on a touch screen and an operation detection region for detecting that a touch operation is performed on the object are set to substantially coincide with each other. Thus, when the touched position is shifted from the display position (operation detection region) of the object, the touch operation is not determined to an operation instruction on the object and becomes an incorrect operation.

Regarding this, Patent Document 1 discloses a technology of reducing a possibility of an erroneous operation when selecting an object moving on a screen. According to Patent Document 1, it is disclosed that, "for each display object displayed on a screen, a reaction region for receiving an input of coordinates by input means is set to be wider than a display range of the display object in accordance with a moving speed of the display object on the screen".

CITATION LIST

Patent Document

Patent Document 1: JP 2012-217101 A

SUMMARY OF THE INVENTION

Problems to be Solved by the Invention

In Patent Document 1, a case where an object displayed on the screen moves is disclosed. However, an erroneous operation may occur even when the object on the screen is still. For example, when a user uses a personal digital assistant while riding in a train, an automobile, or the like, the erroneous operation may occur due to a vehicle rocking. Specifically, it is assumed that the user grips the housing of the personal digital assistant with his/her left hand and performs a touch operation on a touch screen with a finger of the right hand (or a touch pen or the like gripped with the right hand). As the vehicle rocks, the right and left hands of the user rock. However, the rocking states of the right and left hands do not necessarily coincide with each other. As a result, a position different from the intended position on the touch screen may be touched. That is, when the personal digital assistant is operated in the rocking vehicle, an erroneous operation may occur even where a touch target is an object which is still on the screen. Patent Document 1 does not consider an erroneous operation occurring in such a situation.

An object of the present invention is to reduce an erroneous operation occurring when a personal digital assistant including a touch screen is used in a rocking vehicle.

Solutions to Problems

To solve the above problem, a representative personal digital assistant according to the present invention includes a touch screen including an image display unit and a touch panel unit and issues an instruction by a touch operation on the touch screen. The personal digital assistant includes a display control unit that causes an object as a target of the touch operation to be displayed in the image display unit, an image input unit that acquires a video of an operation instruction object that performs the touch operation on the touch screen, and a shaking detection unit that analyzes the video of the operation instruction object, which is acquired by the image input unit, and calculates a relative shaking amount of the operation instruction object to a position of the personal digital assistant as a reference. The display control unit causes the object to be displayed in the image display unit to be displayed, based on the relative shaking amount of the operation instruction object, which is calculated by the shaking detection unit, such that the object is shifted in accordance with the relative shaking amount.

Effects of the Invention

According to the present invention, when the personal digital assistant including the touch screen is used in a rocking vehicle, the occurrence of an erroneous operation is reduced, and thus the usability of the user is improved.

BRIEF DESCRIPTION OF THE DRAWINGS

FIG. 3A is a diagram describing an occurrence of an erroneous operation in the personal digital assistant.

FIG. 6 is a diagram describing erroneous operation prevention processing in Example 2.

FIG. 9A is a diagram illustrating a state using the personal digital assistant through a viewing device (Example 5).

MODE FOR CARRYING OUT THE INVENTION

Hereinafter, an example of an embodiment of the present invention will be described with reference to the drawings. In the examples, a personal digital assistant may be a portable phone, a smart phone, a tablet terminal, and the like. A head mounted information terminal such as a head mounted display (HMD) may be provided. A substitute for the head mounted information terminal by fixing a smart phone, a tablet terminal, or the like to an adapter may be provided. In addition, any digital device including a touch screen, such as a personal digital assistants (PDA), a notebook personal computer (PC), an electronic book reader, a digital still camera, a video camera capable of capturing moving images, and a portable game machine may be provided as a target. In the following description, a smart phone will be mainly described as an example. In the following examples, a case where a user performs a touch operation on an icon or the like displayed on a touch screen will be described as an example. However, an operation target is not limited to the icon, and any object such as a letter, a figure, and a map is provided as the target.

Example 1

[Appearance of Personal Digital Assistant]

Figure 1A:
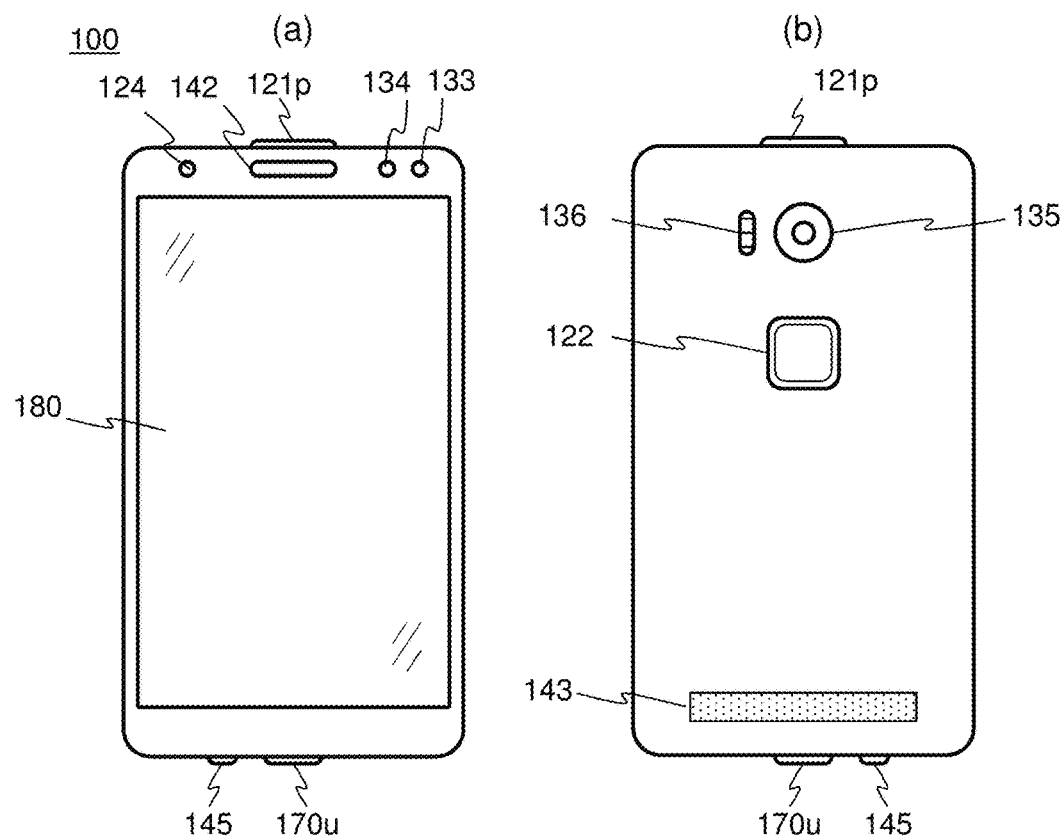
FIG. 1A is an outside view illustrating an example of a personal digital assistant.

FIG. 1A is an outside view illustrating an example of a personal digital assistant 100. Here, regarding a case where the personal digital assistant 100 is a smart phone, (a) is a front (front surface) view, and (b) is a back (back surface) view.

In (a), in addition to a touch screen 180, an operation indicator 124, a first image input unit 133, a second image input unit 134, and a monaural speaker 142 are provided on the front surface of the personal digital assistant 100. The touch screen 180 is configured by a touch panel 123 and an image display unit 131 which will be described later. The touch screen is a screen on which a user performs a touch operation and an object such as an icon is displayed. The operation indicator 124 reports an operation state of the personal digital assistant 100 by whether or not a light emitting diode (LED) lights/blinks. The first image input unit 133 and the second image input unit 134 are "in-cameras" that capture an image of a subject on the front surface side and inputs an image signal. Among the image input units, the first image input unit 133 is used for acquiring an image of an "operation instruction object" such as a finger of the user, which performs a touch operation on the personal digital assistant 100. The second image input unit 134 is used for acquiring a self-portrait image of the user.

In (b), a touch sensor 122, a third image input unit 135, an auxiliary light emission/infrared range finder 136, and a stereo speaker 143 are provided on the back surface of the personal digital assistant 100. The third image input unit 135 is an "out-camera" that captures an image of a subject on the back surface side and inputs an image signal. The auxiliary light emission/infrared range finder 136 is capable of emitting auxiliary light for replenishing insufficiency of light quantity when an image is input from the third image input unit 135. The auxiliary light emission/infrared range finder 136 is capable of measuring a distance to a target using an infrared ray.

A power key 121p which is one of operation keys 121 (described later) is provided on an upper surface of the personal digital assistant 100. A sound input unit 145 and a μ-USB input unit 170u being one of extended interface unit 170 (described later) are provided on a lower surface of the personal digital assistant 100.

Note that the touch sensor 122 may be disposed on a side surface, at a lower portion on the front surface (a portion which does not overlap the touch screen 180), or the like instead of the back surface of the personal digital assistant 100. In addition, the touch panel 123 constituting the touch screen 180 may also have the function of the touch sensor 122. In this case, the function (for example, fingerprint authentication function) of the touch sensor 122 may be performed at any position on the touch screen 180.

[Home Screen of Personal Digital Assistant]

Figure 1B:
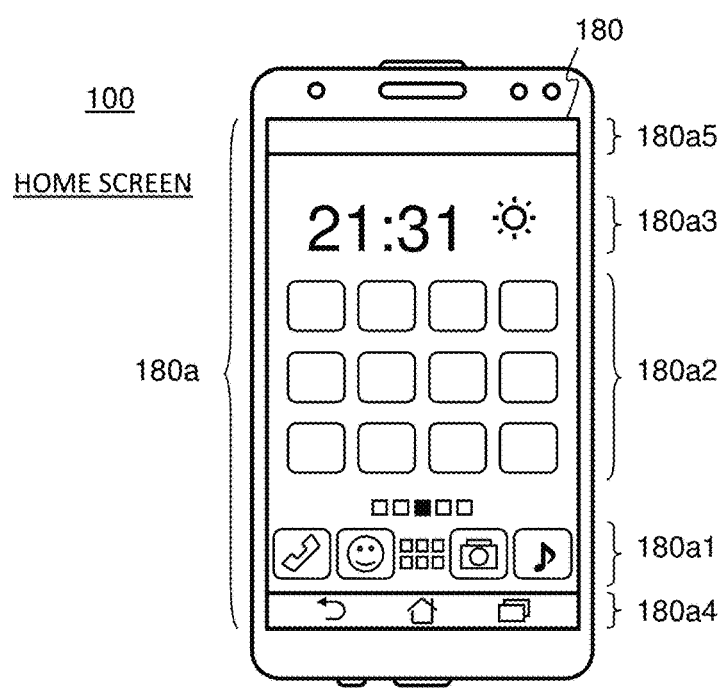
FIG. 1B is a diagram illustrating an example of a home screen displayed in the personal digital assistant.

FIG. 1B is a diagram illustrating an example of a home screen displayed in the personal digital assistant 100. A home screen 180a displayed on the touch screen 180 is configured by a main function icon display region 180a1, a general icon display region 180a2, another information display region 180a3, a control key region 180a4, and a notification region 180a5. The home screen 180a is a basic screen displayed, for example, when a home key is touched after the power of the personal digital assistant 100 turns on, after a sleep state is released, or in the middle of executing any application.

The main function icon display region 180a1 is a display region of icons associated with the main applications which are frequently used in the personal digital assistant 100. The general icon display region 180a2 is a display region of icons associated with other applications. The another information display region 180a3 is a region for displaying general information such as time information and weather information. The control key region 180a4 is a region for displaying a "back key", "a home key", and an "application history key". The notification region 180a5 is a region for a notification of information indicating a radio wave state, the remaining battery level, and the like.

When the user intends to activate a predetermined application on the home screen 180a, the user may tap a target icon (object) displayed in the main function icon display region 180a1 or the general icon display region 180b2 to issue an activation instruction.

[Hardware Configuration of Personal Digital Assistant]

Figure 2A:
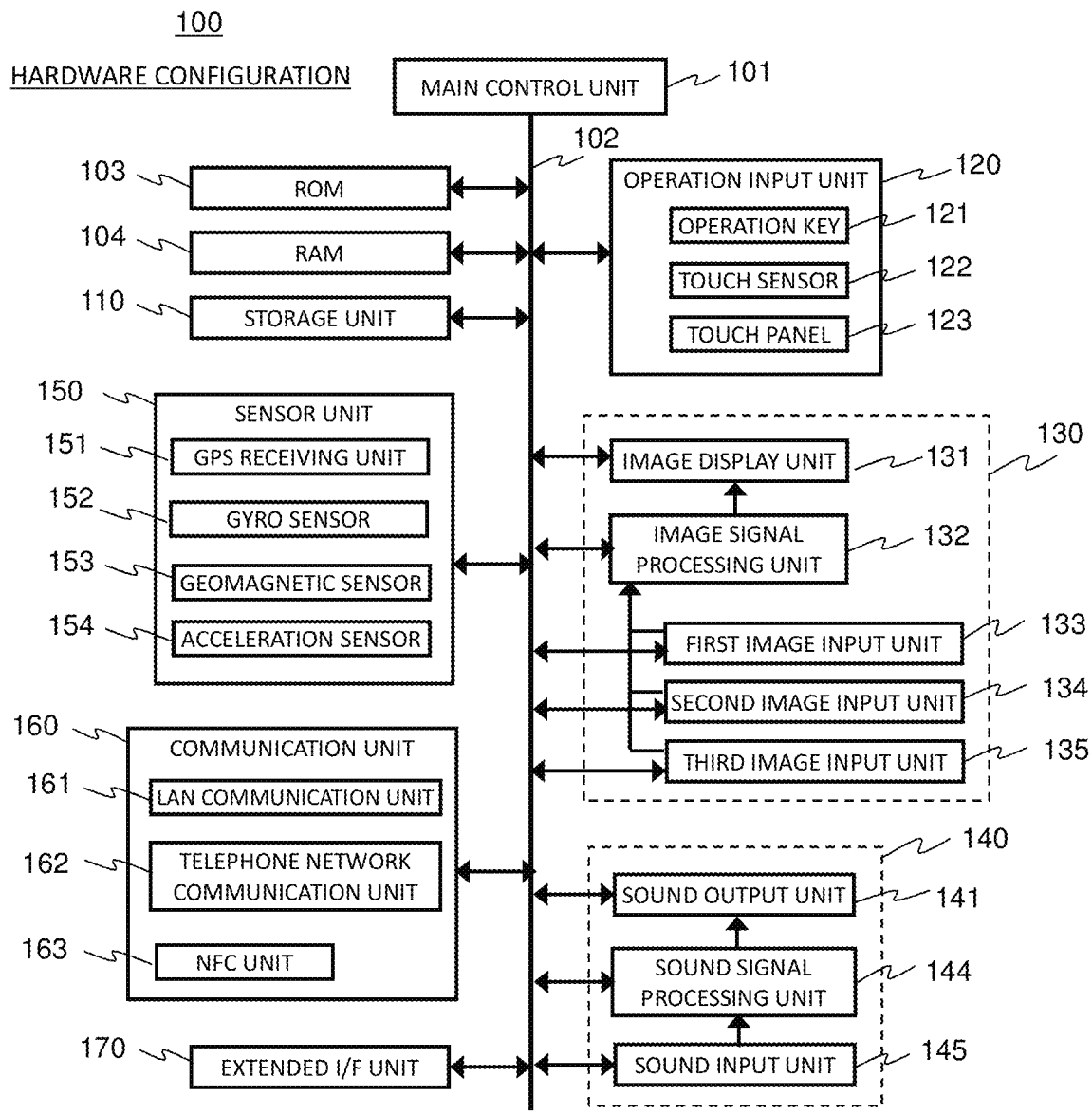
FIG. 2A is a diagram illustrating an example of a hardware configuration of the personal digital assistant.

FIG. 2A is a diagram illustrating an example of a hardware configuration of the personal digital assistant 100. The personal digital assistant 100 is configured to include a main control unit 101, a system bus 102, a ROM 103, a RAM 104, a storage unit 110, an operation input unit 120, an image processing unit 130, a sound processing unit 140, a sensor unit 150, a communication unit 160, and an extended interface unit 170.

The main control unit 101 is a microprocessor unit that controls the entirety of the personal digital assistant 100 in accordance with a predetermined operation program. The system bus 102 is a data communication path for transmitting and receiving various commands and various types of data between the main control unit 101 and each operation block in the personal digital assistant 100.

The read only memory (ROM) 103 is a memory in which a basic operation program such as an operating system or other operation programs (applications, similarly applied below) are stored. For example, a rewritable ROM such as an electrically erasable programmable ROM (EEPROM) or a flash ROM is used. The random access memory (RAM) 104 functions as a work area when the basic operation program or other operation programs are executed. The ROM 103 and the RAM 104 may be integrally configured with the main control unit 101. The ROM 103 may use a partial storage region of the storage unit 110, not be independently configured as illustrated in FIG. 2A.

The storage unit 110 stores the operation program and an operation setting value of the personal digital assistant 100, personal information and authentication information of an authorized user of the personal digital assistant 100, and the like. In addition, the storage unit may store an operation program downloaded from a network, various types of data created in the operation program, and the like. In addition, the storage unit may store contents such as a moving image, a still image, and sounds, which are downloaded from the network. In addition, the storage unit may store data such as a moving image and a still image which are captured using a camera function. All or some of the functions of the ROM 103 may be replaced with a partial area of the storage unit 110. In addition, the storage unit 110 is required to hold information being stored even though the power is not supplied from the outside to the personal digital assistant 100. Thus, devices, for example, a semiconductor element memory such as a flash ROM and a solid state drive (SSD) and a magnetic disk drive such as a hard disc drive (HDD) are used. Note that the operation program stored in the ROM 103 or the storage unit 110 may be updated or have an extended function, by downloading processing from a server device on the network.

The operation input unit 120 is an instruction input unit that inputs an operation instruction to the personal digital assistant 100. The operation input unit 120 is configured by the operation key 121 in which button switches and the like are arranged, the touch sensor 122 that detects a touch of a finger of the user based on a change in electrostatic capacitance, and the touch panel 123 disposed to overlap the image display unit 131. Further, as other operation devices, a keyboard connected to the extended interface unit 170, a separate portable terminal device connected by a wired or wireless communication, and the like may be used. Alternatively, the personal digital assistant 100 may be operated by a sound input. Note that the touch sensor 122 has a function of detecting a fingerprint of a finger or a palm print touching the sensor unit.

The image processing unit 130 is configured by the image display unit 131, an image signal processing unit 132, the first image input unit 133, the second image input unit 134, and the third image input unit 135. The image display unit 131 is a display device such as a liquid crystal panel, for example. The image display unit 131 displays image data processed by the image signal processing unit 132 and provides the image data for the user of the personal digital assistant 100. The image signal processing unit 132 includes a video RAM (not illustrated) and drives the image display unit 131 based on the input image data. In addition, the image signal processing unit 132 performs decoding processing of an encoded video signal, format conversion processing, superimposition processing of menus and other on screen display (OSD) signals, and the like, as necessary. The first image input unit 133, the second image input unit 134, and the third image input unit 135 are image capturing units such as the in-camera and the out-camera. The image input units convert light input from a lens into an electrical signal with an electronic device such as a charge coupled device (CCD) or a complementary metal oxide semiconductor (CMOS) sensor, and take image data of a subject.

The sound processing unit 140 is configured by a sound output unit 141, a sound signal processing unit 144, and the sound input unit 145. The sound output unit 141 is a speaker and provides a sound signal processed by the sound signal processing unit 144 for the user of the personal digital assistant 100. The sound output unit 141 is configured by a monaural speaker and a stereo speaker. The sound signal processing unit 144 performs decoding processing of an encoded sound signal and the like, as necessary. The sound input unit 145 is a microphone, and converts a voice of the user and the like into sound data and inputs the sound data.

The sensor unit 150 is a group of various sensors that detect the state of the personal digital assistant 100. The sensor unit includes a global positioning system (GPS) receiving unit 151, a gyro sensor 152, a geomagnetic sensor 153, and an acceleration sensor 154 as the sensors, and detects the position, the tilt, the direction, and the movement of the personal digital assistant 100. In addition, the sensor unit may include an illuminance sensor, a proximity sensor, an atmospheric pressure sensor, and the like, and detect the brightness of the surroundings, the proximity situation of the surrounding objects, and the like.

The communication unit 160 is configured by a local area network (LAN) communication unit 161, a telephone network communication unit 162, and a near field communication (NFC) unit 163. The LAN communication unit 161 is connected to a network such as the Internet via an access point or the like, and transmits and receives data to and from the server device on the network. The telephone network communication unit 162 performs a telephone communication (call) and transmits and receives data, by a radio communication with a base station and the like of a mobile telephone communication network. The NFC unit 163 performs a wireless communication when being close to a corresponding reader/writer. Further, the communication unit 160 may include a Bluetooth (registered trademark) communication unit or an infrared communication unit.

The extended interface unit 170 is an interface group for extending the function of the personal digital assistant 100 and is configured by a video/sound interface, a universal serial bus (USB) interface, a memory interface, and the like. The video/sound interface performs an input/output of a video signal/sound signal from/to an external video/sound device. The USB interface is connected to a PC, a keyboard, or other USB devices to transmit and receive data. The memory interface is connected to a memory card or other memory media to transmit and receive data.

Note that the configuration example of the personal digital assistant 100 illustrated in FIG. 2A includes multiple components which are not necessary for the operation in this example. Even though the configuration does not include the above components, the effect of this example is not impaired.

[Software Configuration Example of Personal Digital Assistant]

Figure 2B:
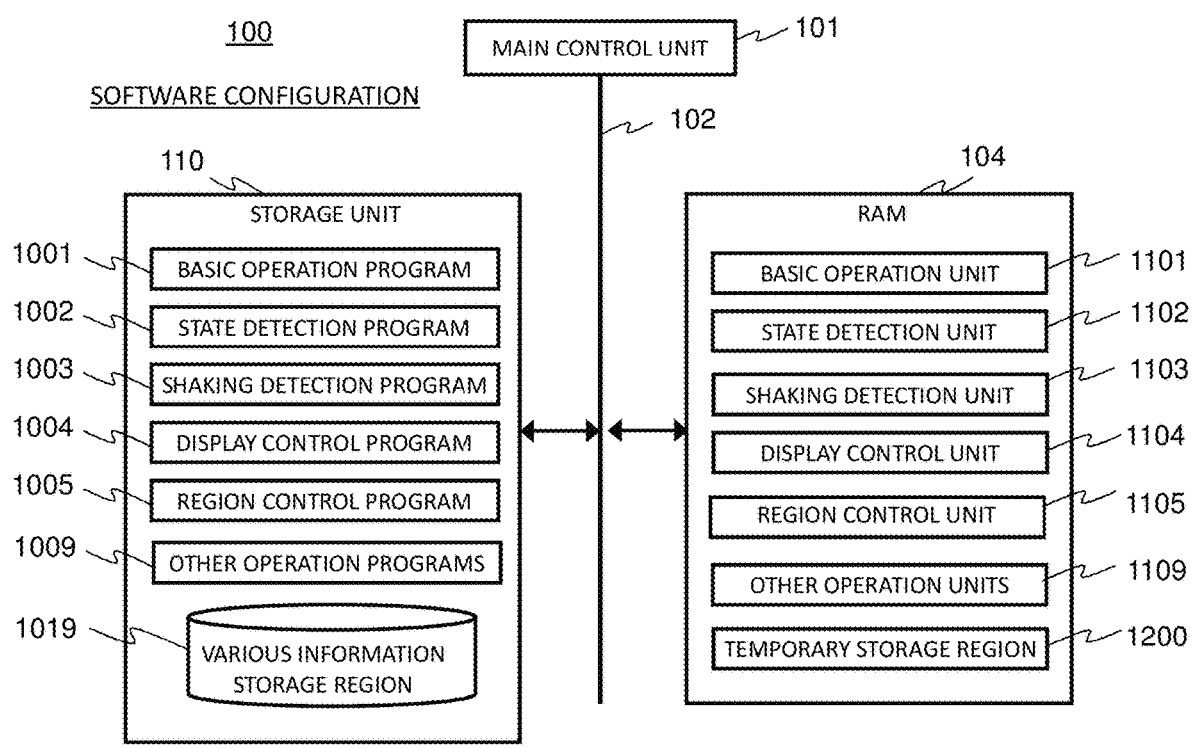
FIG. 2B is a diagram illustrating an example of a software configuration of the personal digital assistant.

FIG. 2B is a diagram illustrating an example of a software configuration of the personal digital assistant 100. Here, FIG. 2B illustrates the software configuration of the storage unit 110 (or ROM 103, similarly applied below) and the RAM 104. A basic operation program 1001, a state detection program 1002, a shaking detection program 1003, a display control program 1004, a region control program 1005, and other operation programs 1009 are stored in the storage unit 110. In addition, the storage unit 110 includes a various-information storage region 1019 in which a terminal identification information allowed to identify the personal digital assistant 100, a user identification information allowed to identify the user of the personal digital assistant 100, and other types of information.

The basic operation program 1001 stored in the storage unit 110 is expanded in the RAM 104, and further the main control unit 101 executes the expanded basic operation program to form a basic operation unit 1101. Similarly, each of the state detection program 1002, the shaking detection program 1003, the display control program 1004, the region control program 1005, and other operation programs 1009 is expanded in the RAM 104, and further the main control unit 101 executes each expanded operation program to form the state detection unit 1102, the shaking detection unit 1103, the display control unit 1104, the region control unit 1105, and other operation units 1109. In addition, the RAM 104 includes a temporary storage region 1200 that temporarily stores data created when each operation program is executed.

Note that, in order to simplify an operation description, descriptions will be made below on the assumption that, regarding processing of controlling each operation block in a manner that the main control unit 101 expands the basic operation program 1001 stored in the storage unit 110, in the RAM 104 and then executed the expanded basic operation program, the basic operation unit 1101 controls each operation block. Similar descriptions are made for operations of other functional blocks by other operation programs.

The state detection unit 1102 controls processing of detecting the operation state (position information, rocking situation, and the like) of the personal digital assistant 100 with the sensor group of the sensor unit 150. The shaking detection unit 1103 detects the relative shaking amount of the operation instruction object (finger of the user, touch pen, or the like) for the personal digital assistant 100, based on the image acquired from the first image input unit 133. The display control unit 1104 performs display control of the image display unit 131 in accordance with the shaking amount of the operation instruction object, which is detected by the shaking detection unit 1103. The region control unit 1105 controls the operation detection region of the touch panel 123 in accordance with the shaking amount of the operation instruction object, which is detected by the shaking detection unit 1103.

Note that the operation program is set to be stored in the storage unit 110 in advance, at a time point of product shipment. Alternatively, after product shipment, the operation program may be acquired from the server device on the network through the LAN communication unit 161, the telephone network communication unit 162, or the like. In addition, the operation program stored in the memory card, an optical disk, or the like may be acquired through the extended interface unit 170 or the like.

[Erroneous Operation Prevention Processing]

The occurrence of an erroneous operation when a touch operation is performed on the touch screen 180 of the personal digital assistant 100 and erroneous operation prevention processing will be described below.

FIG. 3A is a diagram describing an occurrence of an erroneous operation in the personal digital assistant 100. When the user uses the personal digital assistant 100 while riding in a vehicle such as a train or an automobile, an erroneous operation occurs due to the vehicle rocking. The upper part of FIG. 3A is a diagram illustrating the front surface (operation surface) of the personal digital assistant 100 which is being operated by the user. The lower part of FIG. 3A is a diagram illustrating the lower side surface of the personal digital assistant 100.

For example, it is assumed that the user grips the personal digital assistant 100 with a left hand 201 and performs a touch operation with a finger 200 of a right hand. As illustrated in (a), it is assumed that a screen (home screen) 180a including icons and the like is displayed on the touch screen 180 (image display unit 131), and the user touches a target icon 180i1 with the finger 200. It is assumed that, at this time, if the vehicle rocks, as illustrated in (b), the left hand which holds the personal digital assistant 100 shakes, for example, to the left, and the finger 200 of the right hand shakes, for example, to the right. As a result, as illustrated in (c), the user touches not the target icon 180i1 but another icon 180i2 adjacent to the target icon 180i1, and thus an erroneous operation occurs. Note that, with respect to rocking of the vehicle, if a direction/degree of shaking of the personal digital assistant 100 coincides with a direction/degree of shaking of the finger 200 of the right hand, the erroneous operation does not occur. However, in practice, the directions/degrees of the shaking of both the personal digital assistant and the finger of the right hand do not coincide with each other by the posture and the like of the user, in many cases. Thus, it is not possible to avoid the erroneous operation.

Figure 3B:
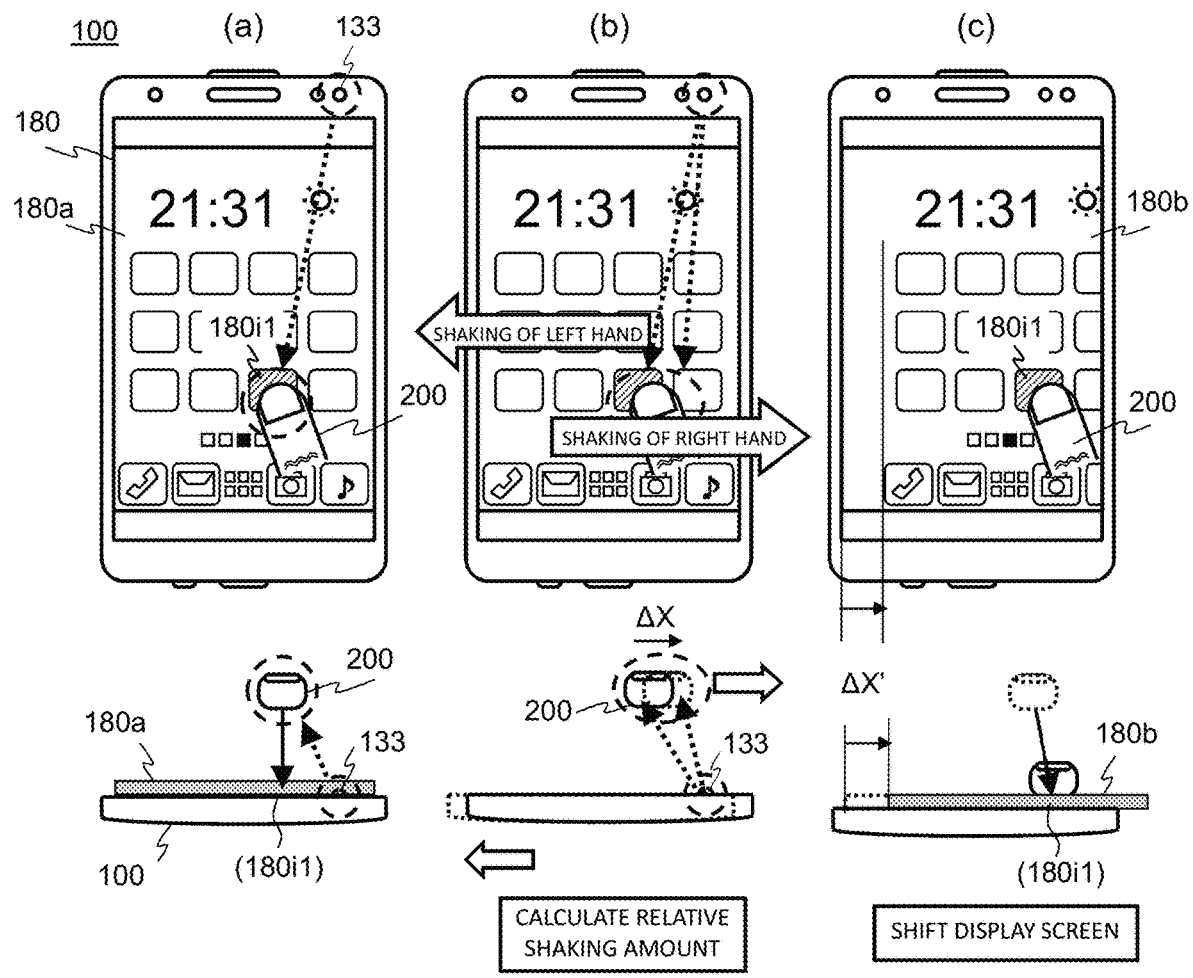
FIG. 3B is a diagram describing erroneous operation prevention processing in Example 1.

FIG. 3B is a diagram describing erroneous operation prevention processing in this example. In the operation state which is the same as that in FIG. 3A, erroneous operation prevention processing may be performed. As illustrated in (a), the first image input unit (in-camera) 133 on the front side acquires the image of the finger 200 intended to touch the target icon 180i1. Then, if the vehicle rocks as illustrated in (b), the shaking detection unit 1103 analyzes the image of the finger 200, which is acquired by the first image input unit 133 and calculates the change in position of the finger 200 with a housing position of the personal digital assistant 100 as a reference, that is, calculates the relative shaking amount $\Delta X$. Then, as illustrated in (c), the display control unit 1104 causes a screen including icons group to be displayed in the touch screen 180 to be displayed with being shifted by a predetermined amount $\Delta X'$ as with display screen 180b, based on the relative shaking amount $\Delta X$ of the finger 200, which is calculated by the shaking detection unit 1103 in accordance with the relative shaking amount $\Delta X$. The shift amount $\Delta X'$ at this time is set to be equal to the shaking amount $\Delta X$ or to be an amount obtained by multiplying the shaking amount $\Delta X$ by a predetermined coefficient. Understandably, the operation detection region of the touch panel 123 corresponding to the icons and the like on the display screen also moves with moving the display screen. As a result, the user can correctly touch the target icon 180i1 with the finger 200 of the right hand even though the vehicle in which the user is riding rocks.

Note that, a case where the left hand of the user, which holds the personal digital assistant 100 and the right hand of the user, which performs a touch operation shake in a right-left direction is described with reference to FIGS. 3A and 3B. However, the above description is also similarly applied to a case where the hands shake in a front-back direction or a diagonal direction.

[Configuration of In-Camera]

Figure 4:
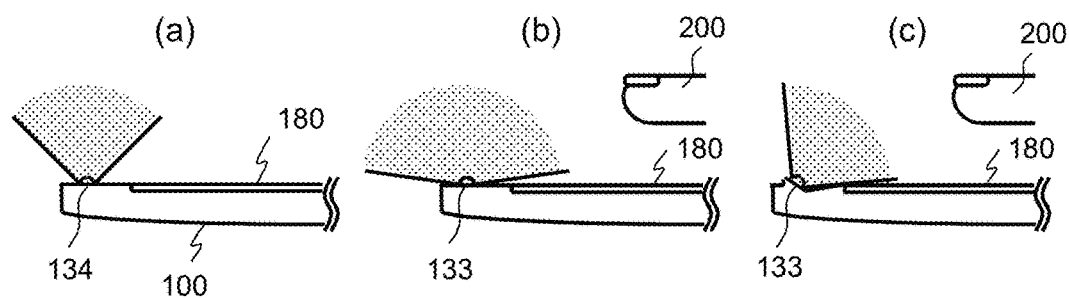
FIG. 4 is a configuration diagram illustrating an in-camera of the personal digital assistant.

FIG. 4 is a diagram describing the configuration of two in-cameras (first image input unit 133 and second image input unit 134) in the personal digital assistant 100 and is a diagram when being viewed from the left side surface of the personal digital assistant 100 (that is, the operation surface is the upper side of FIG. 4).

(a) illustrates the second image input unit 134 and the second image input unit 134 is used as a self-portrait in-camera. The view angle of the camera is about 90 degrees, and this is similar to the case of a general smart phone.

(b) illustrates the first image input unit 133 and the first image input unit 133 is used as an in-camera that captures an image of the operation instruction object (finger 200 of the user and the like) for the above-described erroneous operation prevention processing. In this case, the first image input unit 133 is set to have a view angle (for example, view angle close to 180 degrees) wider than the view angle of the second image input unit 134 such that image capturing is possible even though the finger 200 is close to the touch screen 180.

(c) illustrates another configuration of the first image input unit 133. The view angle is set to be substantially equal to the view angle (about 90 degrees) of the second image input unit 134, but a capturing direction is tilted toward the touch screen 180 side. Thus, capturing the image of the finger 200 close to the touch screen 180 is possible.

Note that, in the personal digital assistant 100 in this example, the configuration of including the two in-cameras (first image input unit 133 and second image input unit 134) is made. However, the in-camera may be shared. In this case, only the first image input unit 133 having a wide view angle illustrated in FIG. 4(*b*) is used for both erroneous operation prevention and the self-portrait. However, in the case of the self-portrait, image processing of, for example, appropriately trimming the acquired captured image is performed.

[Operation Flow of Erroneous Operation Prevention Processing]

Figure 5A:
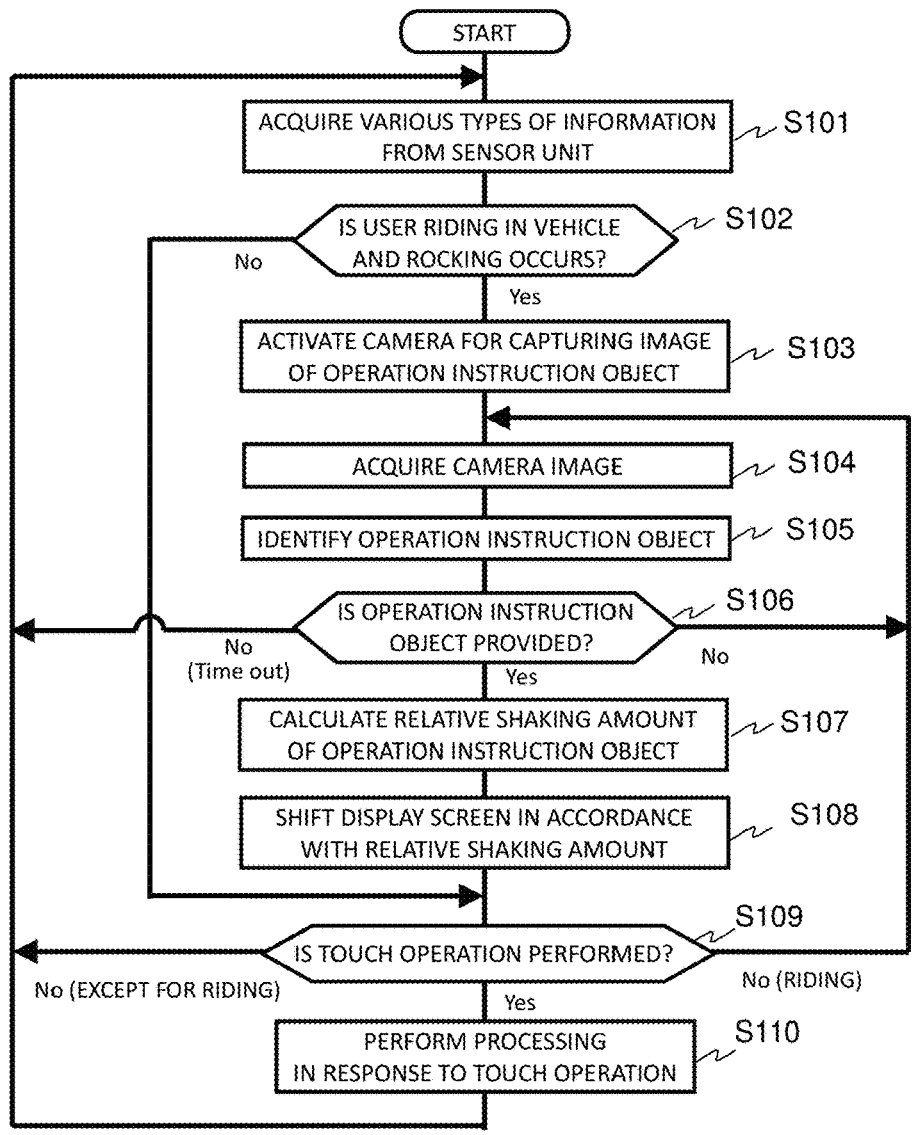
FIG. 5A is a flowchart illustrating the erroneous operation prevention processing in Example 1.

FIG. 5A is a flowchart illustrating the erroneous operation prevention processing in this example. The following processing is mainly controlled by the state detection unit 1102, the shaking detection unit 1103, and the display control unit 1104. Note that it is assumed that whether or not the following erroneous operation prevention processing is performed may be selected by user setting or the like.

Firstly, the state detection unit 1102 acquires position information, tilt information, movement information, or the like of the personal digital assistant 100 from the GPS receiving unit 151, the gyro sensor 152, the acceleration sensor 154, or the like of the sensor unit 150 (S101). Then, the state detection unit 1102 determines whether or not the user who holds the personal digital assistant 100 is riding in a vehicle such as a train or an automobile, and the vehicle rocks (S102), based on each type of information acquired in the process of S101. Note that rocking of the vehicle here means not a state where the vehicle simply moves, but a state where the speed or the acceleration detected by the sensor changes with time by a predetermined amount or more, and an erroneous operation is likely to occur.

When it is determined that the user is riding in the vehicle and the vehicle rocks (S102: Yes) in the process of S102, the process proceeds to the process of S103. When it is determined that the user is not riding in the vehicle, or the vehicle does not rock even though the user is riding in the vehicle (S102: No), the process proceeds to the process of S109. In this case, erroneous operation prevention processing from S103 to S108 described below is not performed, and general touch operation processing is performed.

In the process of S103, the shaking detection unit 1103 activates the first image input unit (operation instruction object capturing camera) 133 that captures an image of the operation instruction object (finger of the user, touch pen, or the like) (S103) and acquires the image on the front surface side of the touch screen 180 (S104). Then, the shaking detection unit 1103 analyzes the captured image acquired from the first image input unit 133 to identify the operation instruction object (S105). Note that, in order to improve identification processing, it is desired that the operation instruction object to be used is registered in advance. In the process of S106, it is determined that the operation instruction object is provided in the captured image. Note that, in this determination, it is necessary to exclude a case where the user does not perform a touch operation even though the operation instruction object is provided in the captured image. Specifically, when the operation instruction object is separate from the touch screen 180 by a predetermined amount or more, it is determined that the operation instruction object is not provided. This will be described later with reference to FIG. 5B.

When the operation instruction object is provided (identification is possible) in the determination of S106 (S106: Yes), the process proceeds to the process of S107. When the operation instruction object is not provided (identification is not possible) in the determination of S106 (S106: No), the process returns to the process of S104, and the camera image is acquired again. In addition, when a state where the operation instruction object is not provided (identification is not possible) continues for a predetermined time or longer (S106: Time out), the process returns to the process of S101. Alternatively, it may be determined that the user does not intend to operate the personal digital assistant 100, and the erroneous operation prevention processing may be ended.

In the process of S107, the shaking detection unit 1103 analyzes the captured image acquired from the first image input unit 133 and calculates the relative shaking amount of the operation instruction object with the position of the housing of the personal digital assistant 100 as a reference (S107). In addition, the shaking detection unit 1103 transmits the calculated relative shaking amount $\Delta X$ of the operation instruction object to the display control unit 1104. The display control unit 1104 performs processing of shifting the display screen to be displayed in the touch screen 180 (image display unit 131) based on the relative shaking amount $\Delta X$ of the operation instruction object, which is received from the shaking detection unit 1103 in accordance with the relative shaking amount $\Delta X$ (S108). At this time, the region control unit 1105 is interlocked with the display control unit 1104 to perform processing of shifting the operation detection region of the touch panel 123 corresponding to the icons and the like on the display screen.

Note that the shift amount $\Delta X'$ of the display screen may be set to substantially equal to the relative shaking amount $\Delta X$ of the operation instruction object, which is calculated in the process of S107. However, the display screen may be set to be shifted by an amount obtained by multiplying a predetermined coefficient k ($\leq 1$) by the relative shaking amount $\Delta X$ ($\Delta X'=k\Delta X$). For example, the coefficient k may be set to 0.5, and the display screen may be shifted by about 50% of the relative shaking amount $\Delta X$. This has effects as follows. That is, the operation detection region corresponding to each icon in the touch panel 123 has a predetermined area, and a slight shift of a touch position is allowed. In addition, since the coefficient k<1 is set, the sensitive shift process of the display screen is not required, and the screen becomes easy for the user to operate.

The basic operation unit 1101 determines whether or not a touch operation of the operation instruction object is performed on the touch screen 180 (touch panel 123), while performing the processes of S101 to S108 (S109). When the touch operation of the operation instruction object is performed (S109: Yes), various types of processing are performed in response to the touch operation (S110). For example, when an icon for a predetermined application is tapped, the corresponding application is activated. When there is no touch operation in the determination of S109, the case is divided into two. When it is determined that the user is riding in the vehicle (rocking occurs) in the determination of S102 (S109: No/riding), the process returns to the process of S104. When it is determined that the user is not riding in the vehicle (and the vehicle does not rock) in the determination of S102 (S109: No/except for riding), the process returns to the process of S101.

Figure 5B:
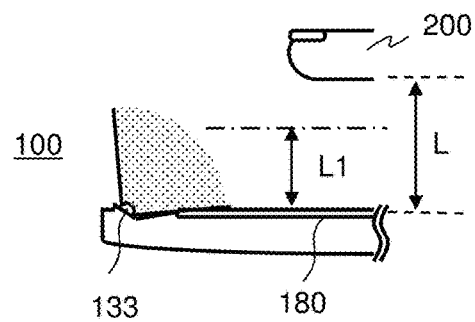
FIG. 5B is a diagram describing details of a process (determining whether or not an operation instruction object is provided) in S106.

FIG. 5B is a diagram describing details of a process (determining whether or not an operation instruction object is provided) in S106. Here, FIG. 5B illustrates a side view of the personal digital assistant 100 and the operation instruction object (finger 200 of the user). The finger 200 of the user is included in the captured image acquired by the first image input unit 133. If the distance between the finger 200 and the touch screen 180 is set to L, when the user performs a touch operation, the distance L is necessarily 0. However, when the distance L is long, this means an operation preparation state before the touch operation (for example, a state where a target icon to be touched is not determined or a state where the target icon is searched in the screen). If the above-described erroneous operation prevention processing is performed in such a preparation state in which the distance L is long, the display screen (icon) moves with following the movement of the finger 200, and thus there is an inconvenience that it is not possible for the user to select the target icon. Thus, the control is performed such that the above-described erroneous operation prevention processing is not performed in the operation preparation state, in other words, in the process of S106, it is determined that the operation instruction object is not provided.

Specifically, a threshold value L1 for the distance L between the operation instruction object and the touch screen 180 is determined. In the case of L≤L1, it is determined that the operation instruction object is provided. In the case of L>L1, it is determined that the operation instruction object is not provided. Note that, since an operation form (touch operation start position is close to the touch screen 180 or far from the touch screen 180) varies for each user, it is preferable that the threshold value L1 may be appropriately set for each user. Thus, a preparation period of the touch operation causes the erroneous operation prevention processing to be invalid, and thus no inconvenience occurs when the user performs the touch operation.

According to Example 1 as described above, even when the user who is riding in a rocking vehicle uses the personal digital assistant 100, the position of the display screen is set to be shifted in accordance with the relative shaking amount of the operation instruction unit to follow the relative shaking amount. Thus, it is possible to prevent the occurrence of an erroneous operation due to the shift of the touch operation position.

Example 2

In Example 2, for the erroneous operation prevention processing, processing of maintaining the position of the display screen and shifting the detection region of the touch operation is performed. Note that the basic configuration of the personal digital assistant 100 is similar to that in Example 1. Differences from Example 1 will be mainly described below, and repetitive descriptions of the common portions will be omitted.

FIG. 6 is a diagram describing erroneous operation prevention processing in this example. (a) to (c) correspond to (a) to (c) of FIG. 3B in Example 1. Here, a screen displayed on the touch screen 180 is set to 180a, and the operation detection regions on the touch panel 123, which respectively correspond to icons are indicated by broken-line frames 123a and 123b.

As illustrated in (a), the first image input unit (operation instruction object capturing camera) 133 on the front side acquires the image of the finger 200 intended to touch the target icon 180i1. In this state, the operation detection region 123a of each icon coincides with the display position of each icon on the display screen 180a. Then, if the vehicle rocks as illustrated in (b), the shaking detection unit 1103 analyzes the image of the finger 200, which is acquired by the first image input unit 133 and calculates the change in position of the finger 200 with a housing position of the personal digital assistant 100 as a reference, that is, calculates the relative shaking amount ΔX.

In (c), the screen 180a displayed on the touch screen 180 is maintained, and the region control unit 1105 sets the operation detection region on the touch panel 123, which corresponds to the displayed icon to be shifted (as with 123b) by a predetermined amount ΔX' based on the relative shaking amount ΔX of the finger 200, which is calculated by the shaking detection unit 1103, in accordance with the relative shaking amount ΔX.

For example, the detection region corresponding to the icon 180i1 is set to a position (indicated by a diagonal line) which is shifted to the right of the display position of the icon 180i1. As a result, even though the finger 200 touches the position shifted to the right of the display region of the target icon 180i1 by relative shaking, it is detected that the touch operation is correctly performed on the icon 180i1, because the detection region is set to follow the shift.

In the operation flow in Example 2, a portion of the flowchart illustrated in FIG. 5A is changed. That is, in the process of S108, the region control unit 1105 performs processing of shifting the operation detection region of the touch panel 123 corresponding to each icon and the like on the display screen by ΔX', based on the relative shaking amount ΔX of the operation instruction object, which is received from the shaking detection unit 1103. At this time, the relation between the relative shaking amount ΔX of the operation instruction object and the shift amount ΔX' of the detection region may satisfy ΔX'=kΔX using the coefficient k (≤1), similar to Example 1. Other processes are similar to the flowchart illustrated in FIG. 5A.

According to Example 2 as described above, even when the user who is riding in a rocking vehicle uses the personal digital assistant 100, the position of the operation detection region is set to be shifted in accordance with the relative shaking amount of the operation instruction unit. Thus, it is possible to prevent the occurrence of an erroneous operation due to the shift of the touch operation position.

Example 3

In Example 3, for the erroneous operation prevention processing, a display space between icons on the display screen is set to be widened. The basic configuration of the personal digital assistant 100 is similar to that in Example 1. Differences from Example 1 will be mainly described below.

Figure 7A:
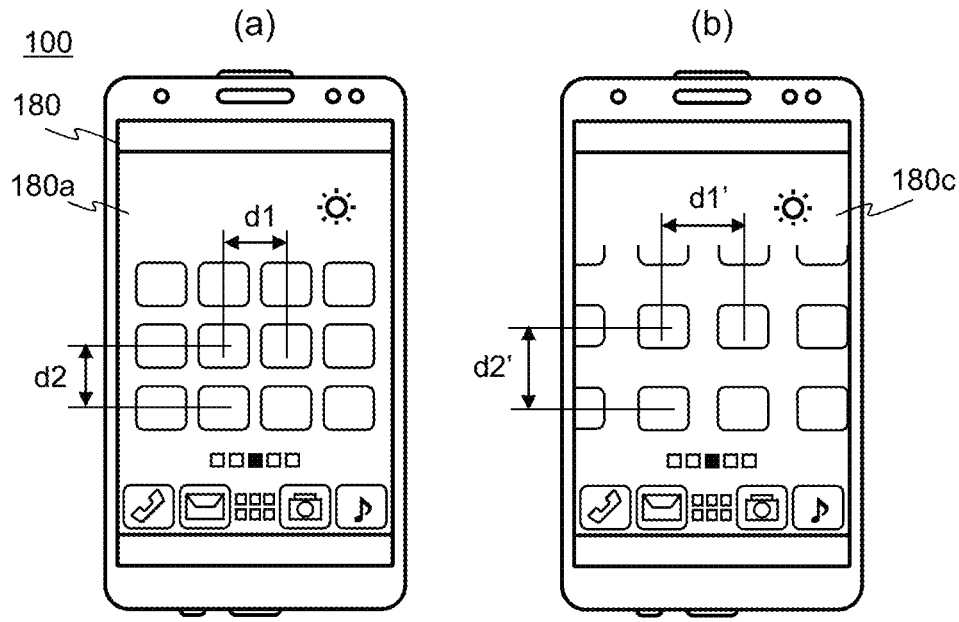
FIG. 7A is a diagram describing erroneous operation prevention processing in Example 3.

FIG. 7A is a diagram describing erroneous operation prevention processing in this example. (a) illustrates an example of the display screen 180a when the user is not riding in the vehicle or the vehicle does not rock even though the user is in the vehicle. The display control unit 1104 sets the display space between icons in the display screen 180a to be a normal space (d1 in a screen transverse direction, d2 in a vertical direction). Meanwhile, (b) illustrates an example of a display screen 180c when the user is riding in the vehicle and the vehicle rocks. The display control unit 1104 sets the display space between icons in the display screen 180c to be a wide space (d1' in the screen transverse direction, d2' in the vertical direction) (d1'>d1, d2'>d2). As described above, since the space between the icons is set to be widened when the vehicle rocks, it is possible to reduce the occurrence of the erroneous touch operation even though the position of the hand of the user shakes.

Here, the space between the icons is set to be widened for the erroneous operation prevention processing. However, while the space is set to be widened, the region control unit 1105 performs processing of expanding the operation detection region of the touch panel 123, which corresponds to each icon on the display screen, and thus an effect of further reducing the occurrence of the erroneous operation is obtained.

Figure 7B:
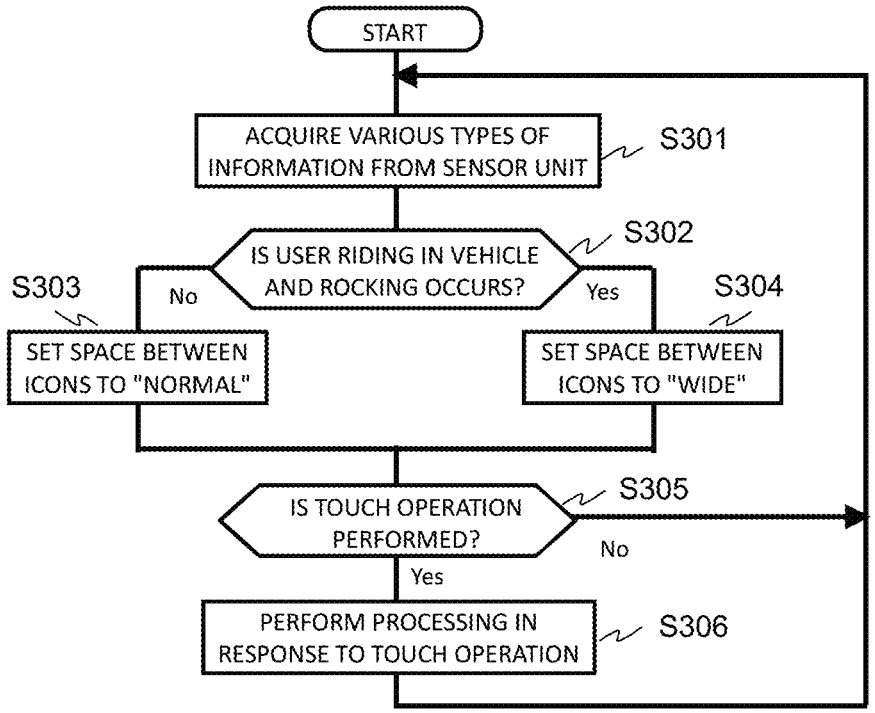
FIG. 7B is a flowchart illustrating the erroneous operation prevention processing in Example 3.

FIG. 7B is a flowchart illustrating the erroneous operation prevention processing in this example. The following processing is mainly controlled by the state detection unit 1102 and the display control unit 1104.

Firstly, the state detection unit 1102 acquires position information, tilt information, movement information, or the like of the personal digital assistant 100 from the sensor unit 150 (S301). Then, the state detection unit 1102 determines whether or not the user who holds the personal digital assistant 100 is riding in a vehicle, and the vehicle rocks, based on each type of information acquired in the process of S301. (S302).

When it is determined that the user is not riding in the vehicle, or the vehicle does not rock even though the user is riding in the vehicle (S302: No) in the process of S302, the process proceeds to the process of S303. When it is determined that the user is riding in the vehicle and the vehicle rocks (S302: Yes), the process proceeds to the process of S304.

In the process of S303, the display control unit 1104 sets the space between the icons displayed on the touch screen 180 to the normal space (d1, d2) and performs screen display. Meanwhile, in the process of S304, the display control unit 1104 sets the space between the icons displayed on the touch screen 180 to a wide space (d1', d2') and performs screen display. In this case, the region control unit 1105 may expand the operation detection region of the touch panel 123, which corresponds to each icon on the display screen.

The basic operation unit 1101 checks whether or not a touch operation of the operation instruction object is performed on the touch screen 180 (touch panel 123), while performing the processes of S301 to S304 (S305). When the touch operation of the operation instruction object is performed (S305: Yes), various types of processing are performed in response to the touch operation (S306). When there is no touch operation of the operation instruction object (S305: No), the process returns to the process of S301.

In the above description, there is one space (d1', d2') between icons, which is set when the vehicle rocks. However, a plurality of spaces may also be set in accordance with the degree of the vehicle rocking.

According to Example 3 as described above, when the user who is riding in a rocking vehicle uses the personal digital assistant 100, the icons are displayed such that the display space between icons in the display screen is widened. Thus, it is possible to prevent the occurrence of an erroneous operation due to the shift of the touch operation position.

Example 4

In Example 4, for the erroneous operation prevention processing, a confirmation screen for whether or not the touch operation is correct is displayed. This processing may be performed singly or in combination with the processing in Examples 1 to 3.

Figure 8A:
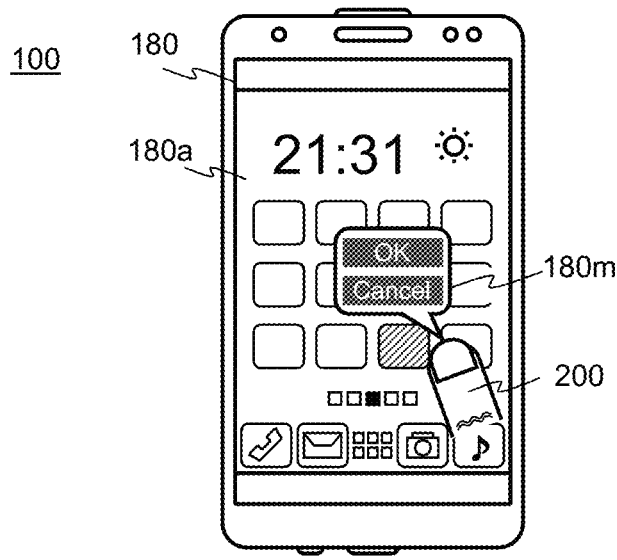
FIG. 8A is a diagram illustrating a confirmation screen for preventing an occurrence of an erroneous operation in Example 4.

FIG. 8A is a diagram illustrating the confirmation screen for preventing the occurrence of an erroneous operation in this example. When the touch operation of the operation instruction object (finger 200 of the user) is performed on the touch screen 180, the display control unit 1104 displays an operation confirmation message 180m, suspends the operation, and waits for the response of the user. In the operation confirmation message 180m, an "OK" button for the response of the user when this performed operation is correct (normal operation) and a "Cancel" button for the response when the operation is incorrect (erroneous operation) are displayed. The user determines whether the operation is correct or incorrect, from this performed touch position and selects any button.

When the user selects the "OK" button, this performed touch operation is set to be valid, and various types of processing in response to the touch operation are performed. When the user selects the "Cancel" button, this performed touch operation is set to be invalid, and the touch operation of the user is received again.

Figure 8B:
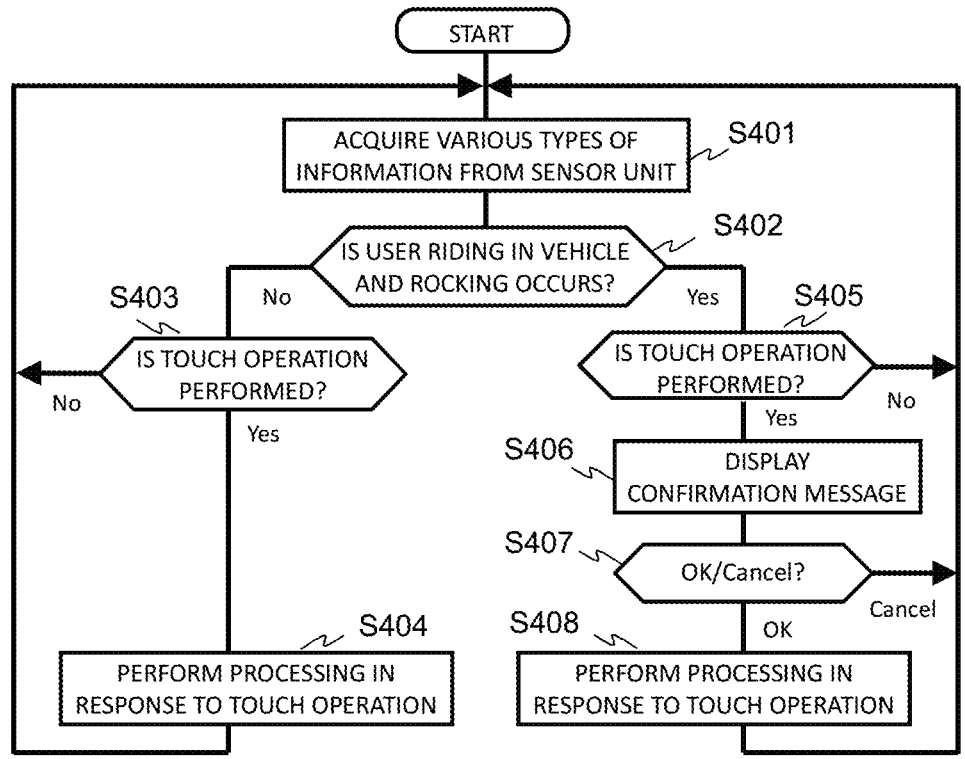
FIG. 8B is a flowchart illustrating the erroneous operation prevention processing in Example 4.

FIG. 8B is a flowchart illustrating the erroneous operation prevention processing in this example. The following processing is mainly controlled by the state detection unit 1102 and the display control unit 1104.

Firstly, the state detection unit 1102 acquires position information, tilt information, movement information, or the like of the personal digital assistant 100 from the sensor unit 150 (S401). Then, the state detection unit 1102 determines whether or not the user who holds the personal digital assistant 100 is riding in a vehicle, and the vehicle rocks, based on each type of information acquired in the process of S401 (S402).

When it is determined that the user is not riding in the vehicle, or the vehicle does not rock even though the user is riding in the vehicle (S402: No) in the process of S402, the process proceeds to the process of S403. When it is determined that the user is riding in the vehicle and the vehicle rocks (S402: Yes), the process proceeds to the process of S405.

In the process of S403, the basic operation unit 1101 checks whether or not the touch operation of the operation instruction object is performed on the touch screen 180 (touch panel 123). When the touch operation of the operation instruction object is performed (S403: Yes), various types of processing are performed in response to the touch operation (S404). When there is no touch operation of the operation instruction object (S403: No), the process returns to the process of S401.

In the process of S405, the basic operation unit 1101 checks whether or not the touch operation of the operation instruction object is performed on the touch screen 180. When the touch operation of the operation instruction object is performed (S405: Yes), the operation confirmation message 180m (OK/Cancel button) for confirming whether or not the touch operation is correct is displayed (S406). When there is no touch operation of the operation instruction object (S405: No), the process returns to the process of S401.

In the process of S407, the response of the user to the operation confirmation message 180m is received. When the user selects the OK button (the touch operation is a normal operation) (S407: OK), various types of processing in response to the touch operation are performed (S408). When the user selects the Cancel button (the touch operation is an erroneous operation) (S407: Cancel), the process returns to the process of S401.

According to Example 4 as described above, when the user who is riding in a rocking vehicle uses the personal digital assistant 100, the confirmation screen for whether or not the touch operation performed by the user is correct is displayed. Thus, it is possible to transition to a correction operation immediately when the erroneous operation is performed, and thus the usability of the user is improved.

Note that, in the above example, the operation confirmation message 180m is displayed for erroneous operation prevention. Instead, it may be determine whether or not the touch operation is correct, by the length of a time when a touch state continues. For example, when the time when the touch state continues is equal to or longer than a predetermined time, the touch operation is determined to be valid. When the time when the touch state continues is shorter than the predetermined time, the touch operation is determined to be invalid. Alternatively, the definition of the validity/invalidity may be set to be reversed, depending on the user. Further, the operation confirmation message may be displayed only when the touch state continues for a predetermined time or longer.

Further, in a case where the user recognizes that the user touches an erroneous icon, before the operation is confirmed, it is possible to perform an operation of selecting the target icon again by sliding the finger to the target icon position in a state where the finger is touched on the touch screen surface. Then, the operation confirmation message is displayed in this state. Thus, it is possible to continuously perform the correction operation and the confirmation operation. Note that, when the finger is slid with being touched in a state of waiting for confirmation of the touch operation, the display position of the icon is fixed. In addition, when the finger is slid with being touched in a state of not waiting for confirmation of the touch operation, the display position of the icon may move. Thus, the convenience is further improved.

Example 5

In Example 5, a viewing device that is mounted on the head of the user and is capable of displaying virtual reality (VR) and the like will be described as a usage form of the personal digital assistant 100. In this case, similarly, the erroneous operation prevention processing is also set to be valid.

FIG. 9A is a diagram illustrating a state using the personal digital assistant 100 through a viewing device 10. The personal digital assistant 100 is inserted into the viewing device (adapter) 10, and the user 1 mounts and uses the resultant of the insertion. (a) is a top view when a user 1 mounting the viewing device 10 is viewed from the top. (b) is a front view when the user 1 mounting the viewing device 10 is viewed from the front. It is possible to realize a function similar to that of a head mounted display (HMD) by using such a viewing device 10. Alternatively, instead of the viewing device 10, a form in which the user 1 grips the personal digital assistant 100 with both hands or one hand such that the personal digital assistant 100 is disposed in front of the eyes of the user.

The viewing device 10 has a configuration in which the personal digital assistant 100 such as a smart phone or a tablet terminal is inserted into a slit portion 20 and supported. The user 1 places the viewing device 10 into which the personal digital assistant 100 is inserted and fixes the viewing device 10 on the head by using a belt or the like. The display screen (image display unit 131) of the personal digital assistant 100 may perform virtual reality (VR) display or mixed reality (MR) in which an artifact created by computer graphics (CG) is superimposed on image data (camera image) input from the third image input unit 135 being the out-camera. In addition, in the case of the HMD including a transmissive display, it is possible to perform augmented reality (AR) display and the like in which an artifact created by CG and the like is superimposed on the surrounding scenery.

An image to be displayed on the display screen of the personal digital assistant 100 is incident to the eyes of the user 1 through a lens unit 11 disposed in the viewing device 10. In addition, a partition wall portion 12 prevents mixing of images that have passed through the right and left lens units 11. Note that the slit portion 20, the lens unit 11, the partition wall portion 12, and the like described above are used for describing the internal configuration of the viewing device 10 and are not exposed in a normal time. In addition, in the normal time, a portion of the housing of the viewing device 10 covers the personal digital assistant 100 like a lid, and it is desired to make a structure in which the personal digital assistant 100 falls down or is shifted is prevented even when the head of the user 1 moves up and down and right and left. In addition, a window 13 is provided in the housing of the viewing device 10, and thus a structure in which the third image input unit 135 provided on the back surface of the personal digital assistant 100 is exposed is obtained.

Figure 9B:
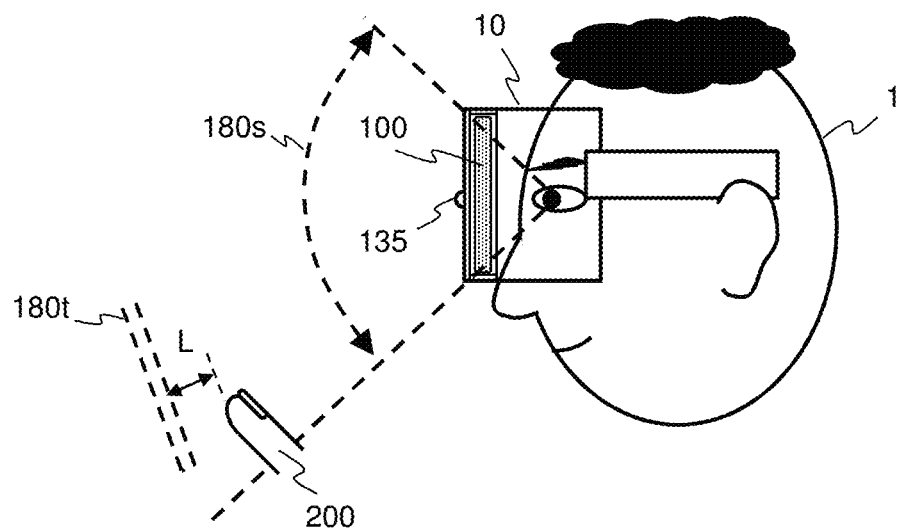
FIG. 9B is a diagram describing erroneous operation prevention processing in Example 5.

FIG. 9B is a diagram describing the erroneous operation prevention processing in this example and illustrates a state where the user operates the personal digital assistant 100. The user 1 visually recognizes image data input from the third image input unit 135 of the personal digital assistant 100 through the image display unit 131, and thus obtains a virtual view range 180s. In addition, a virtual operation panel 180t is disposed at a predetermined distance forward position in the virtual view range 180s. The user 1 operates an icon and the like in the virtual operation panel 180t with the real finger 200, and thus can issue an operation instruction on the personal digital assistant 100.

For example, it is assumed that the user 1 who is riding in the vehicle performs a touch operation on a target icon on the virtual operation panel 180t with the finger 200 of the right hand. With the vehicle rocking, the virtual operation panel 180t may shake to the left and the finger 200 of the right hand may shake to the right, for example by the head of the user shaking to the left. As a result, the user touches another icon, not the target icon on the virtual operation panel 180t, and thus an erroneous operation occurs.

Regarding this, it is possible to apply the erroneous operation prevention processing similar to that in Example 1 described above. The third image input unit (out-camera) 135 of the personal digital assistant 100 acquires an image of the finger 200 intended to perform a touch operation on the virtual operation panel 180t. The shaking detection unit 1103 analyzes the image of the finger 200, which is acquired by the third image input unit 135 and calculates the relative shaking amount of the finger 200 with the display position of the virtual operation panel 180t (or the housing position of the personal digital assistant 100) as a reference. Further, the display control unit 1104 performs a control to display the display position of the virtual operation panel 180t in the virtual view range 180s to be shifted by ΔX' based on the calculated relative shaking amount ΔX of the finger 200.

In this case, the determination of whether or not the operation instruction object (finger 200) is provided, which is described with reference to FIG. 5B, may be applied. That is, it is possible to calculate the distance L from the virtual operation panel 180t to the finger 200 by the auxiliary light emission/infrared range finder 136 measuring the distance from the personal digital assistant 100 to the finger 200. At this time, the erroneous operation prevention processing may be set to be valid only when the distance L is equal to or less than the threshold value. In addition, in the case of the virtual operation panel 180t in this example, the display position may be three-dimensionally shifted including a line-of-sight direction. As a result, even though the user uses the personal digital assistant 100 through the viewing device 10, it is possible to prevent the occurrence of an erroneous operation by the vehicle rocking.

Hitherto, the embodiment of the present invention has been described with Examples 1 to 5, but it goes without saying that the configuration for realizing the technology of the present invention is not limited to the above-described embodiment, and various modifications can be considered. For example, the description has been made on the assumption that the icon (object) displayed on the touch screen is still. However, it is also possible to apply the erroneous operation prevention processing of the present invention to a case where the icon moves, and the similar effects are obtained. In addition, the object is not limited to the icon and is also effective when an image such as a map is displayed and the user designates a certain position on the map by a touch operation.

Between each embodiment, a portion of the configuration of a certain example may be replaced with the configuration of another example. In addition, the configuration of a certain example may be added to the configuration of another example. All of the modifications belong to the category of the present invention. In addition, the numerical values, the messages, and the like appearing in the text and the drawings are just examples, and the effects of the present invention are not impaired even though different ones are used.

The functions and the like of the present invention described above may be realized by hardware in a manner that some or all functions are designed with, for example, an integrated circuit. In addition, the microprocessor unit and the like may be realized by software in a manner that a program for realizing each function or the like is interpreted and executed. The hardware and the software may be used together. The software may be stored in the ROM 103, the storage unit 110, or the like of the personal digital assistant 100 in advance at the time of product shipment. The software may be acquired from various server devices on the Internet, after the product shipment. In addition, the software provided in a memory card, an optical disk, or the like may be acquired.

In addition, the control lines and information lines illustrated in the drawing are those considered to be necessary for explanation, and not all control lines and information lines on the product are necessarily illustrated. In practice, it may be considered that almost all components are connected to each other.

REFERENCE SIGNS LIST

10 Viewing device
100 Personal digital assistant
123 Touch panel
123a, b Operation detection region
131 Image display unit
133 First image input unit (operation instruction object capturing camera)
134 Second image input unit (in-camera)
135 Third image input unit (out-camera)
150 Sensor unit
180 Touch screen
180a, b, c Display screen
180i Icon
180m Operation confirmation message
180t Virtual operation panel
200 Finger of user (operation instruction object)
1101 Basic operation unit
1102 State detection unit
1103 Shaking detection unit
1104 Display control unit
1105 Region control unit

The invention claimed is:

1. A head mounted display comprising:
an image display device,
a processor configured to control to set a virtual operation panel at a predetermined distance position in a virtual visual space area via the image display device, and
a camera configured to acquire a video of an operation instruction object that performs an operation on the virtual operation panel;
wherein the processor is configured to:
analyze the video of the operation instruction object, which is acquired by the camera;
in a case of moving at least one of the virtual operation panel or the operation instruction object, calculate a three-dimensional relative shaking amount of the operation instruction object with respect to a three-dimensional position of the virtual operation panel at a virtual position; and
based on the three-dimensional relative shaking amount of the operation instruction object, control the image display device to display the virtual operation panel while shifting three-dimensionally the virtual operation panel in accordance with the operation instruction object from the virtual position.

2. The head mounted display according to claim 1, wherein the processor is further configured to:
measure a distance between the operation instruction object and the virtual operation panel from the video of the operation instruction object; and
when the distance is greater than a threshold value, control the virtual operation panel to be displayed without being three-dimensionally shifted.

3. The head mounted display according to claim 1, further comprising:
a sensor configured to detect a state of the head mounted display,
wherein the processor is further configured to, when the operation is performed on the virtual operation panel while determining that the state of the head mounted display is a rocking state by the sensor, control the image display device to display a confirmation screen for confirming whether or not the operation is correct.

4. The head mounted display according to claim 3, wherein the confirmation screen is displayed in an overlaid manner.

5. The head mounted display according to claim 1, wherein the three-dimensional relative shaking amount of the operation instruction object with respect to the three-dimensional position of the virtual operation panel includes a shaking amount of the virtual operation panel in a line-of-sight direction.

6. The head mounted display according to claim 1, further comprising:
   a sensor configured to detect a state of the head mounted display,
   wherein the processor is further configured to:
   when the state of the head mounted display is determined to not be in a vehicle or if there is no rocking even though the head mounted display is in the vehicle by the sensor, control the virtual operation panel to be displayed without being three-dimensionally shifted.

7. A method performed by a head mounted display including an image display device, the method comprising the steps of:
   controlling to set a virtual operation panel at a predetermined distance position in a virtual visual space area via the image display device;
   acquiring a video of an operation instruction object that performs an operation on the virtual operation panel;
   analyzing the video of the operation instruction object, in a case of moving at least one of the virtual operation panel or the operation instruction object, calculating a three-dimensional relative shaking amount of the operation instruction object with respect to a three-dimensional position of the virtual operation panel at a virtual position; and
   based on the three-dimensional relative shaking amount of the operation instruction object, controlling the image display device to display the virtual operation panel while shifting three-dimensionally the virtual operation panel in accordance with the operation instruction object from the virtual position.

8. The method according to claim 7, further comprising the steps of:
   measuring a distance between the operation instruction object and the virtual operation panel from the video of the operation instruction object; and
   when the distance is greater than a threshold value, controlling the virtual operation panel to be displayed without being three-dimensionally shifted.

9. The method according to claim 7, further comprising the steps of:
   detecting a state of the head mounted display; and
   when the operation is performed on the virtual operation panel while determining that the state of the head mounted display is a rocking state by the sensor, controlling the image display device to display a confirmation screen for confirming whether or not the operation is correct.

10. The method according to claim 9, further comprising the step of:
    displaying the confirmation screen in an overlaid manner.

11. The method according to claim 7,
    wherein the three-dimensional relative shaking amount of the operation instruction object with respect to the three-dimensional position of the virtual operation panel includes a shaking amount of the virtual operation panel in a line-of-sight direction.

12. The method according to claim 7, further comprising the steps of:
    detecting a state of the head mounted display; and
    when the state of the head mounted display is determined to not be in a vehicle or if there is no rocking even though the head mounted display is in the vehicle by the sensor, controlling the virtual operation panel to be displayed without being three-dimensionally shifted.

* * * * *